(12) United States Patent
Cawood (10) Patent No.: US 9,948,083 B2
(45) Date of Patent: *Apr. 17, 2018

(54) AUTOMATIC SPLICE WATER DRIP NOSE CONE

(71) Applicant: Thomas & Betts International, LLC, Wilmington, DE (US)

(72) Inventor: Matthew D. Cawood, De Leon Springs, FL (US)

(73) Assignee: Thomas & Betts International, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/356,858

(22) Filed: Nov. 21, 2016

(65) Prior Publication Data

US 2017/0070042 A1 Mar. 9, 2017

Related U.S. Application Data (63) Continuation of application No. 13/630,625, filed on Sep. 28, 2012, now Pat. No. 9,537,297.

(60) Provisional application No. 61/541,846, filed on Sep. 30, 2011.

(51) Int. Cl.
| | |
|---|---|
| *H02G 15/18* | (2006.01) |
| *H02G 1/14* | (2006.01) |
| *H01R 13/52* | (2006.01) |

(52) U.S. Cl.
CPC ............... *H02G 15/18* (2013.01); *H02G 1/14* (2013.01); *H01R 13/5227* (2013.01)

(58) Field of Classification Search
CPC . H01B 4/00; H01B 4/023; H01B 4/18; H01B 4/183; H01B 4/186; H01B 4/20; H01B 4/22; H01B 4/26–4/28; H01B 4/32; H01B 4/48; H01B 4/4818; H01B 4/4863; H01B 4/50; H01B 4/5041; H01B 4/5066; H01B 4/4152; H01R 11/00; H01R 11/11; H01R 12/00
USPC .... 174/74 R, 78, 84 R, 84 C, 84 S; 439/784, 439/462, 805
See application file for complete search history.

(56) References Cited

U.S. PATENT DOCUMENTS

| | | | | |
|---|---|---|---|---|
| 1,854,783 | A * | 4/1932 | Cook | H01R 4/52 174/84 S |
| 3,183,302 | A * | 5/1965 | Wochner | H01R 4/20 174/138 F |
| 3,205,300 | A * | 9/1965 | Becker | H01R 4/52 174/84 S |
| 3,484,541 | A * | 12/1969 | Campbell | H02G 15/18 174/138 F |
| 3,681,512 | A * | 8/1972 | Werner | H01R 4/08 102/202.9 |
| 4,362,352 | A * | 12/1982 | Hawkins | H01R 4/52 174/90 |

(Continued)

*Primary Examiner* — William H Mayo, III
(74) *Attorney, Agent, or Firm* — Butler Snow LLP (57) ABSTRACT

A device for preventing the intrusion of water or other liquids into the interior of an automatic splice. The device may be constructed in a single-piece or two-piece design and includes a series of fingers that contact the cable stranding and wick water away from the cable and out of the connector. These fingers could be integrally molded into the cable cone or molded as a separate piece and inserted. They could also be constructed of any typical brush material such as metal, plastic, rubber, or fiber. The fingers could be arranged in a variety of configurations.

25 Claims, 8 Drawing Sheets

(56) References Cited

U.S. PATENT DOCUMENTS

| | | | | |
|---|---|---|---|---|
| 4,472,222 A * | 9/1984 | Moisson | G02B 6/4476 | 156/49 |
| 4,647,713 A * | 3/1987 | de Nijs | H02G 15/117 | 138/162 |
| 4,698,031 A * | 10/1987 | Dawson | F16G 11/048 | 439/863 |
| 5,046,766 A * | 9/1991 | Lomberty | F16L 25/0036 | 174/92 |
| 5,266,742 A * | 11/1993 | Heier | H02G 15/013 | 174/74 R |
| 5,278,353 A * | 1/1994 | Buchholz | H01R 4/52 | 174/84 R |
| 5,683,273 A * | 11/1997 | Garver | H01R 4/5025 | 174/84 R |
| 5,834,694 A * | 11/1998 | Bakker | H02G 3/088 | 174/135 |
| 5,844,171 A * | 12/1998 | Fitzgerald | H02G 15/18 | 174/138 F |
| 5,886,300 A * | 3/1999 | Strickler | G02B 6/4444 | 174/135 |
| 6,246,003 B1 * | 6/2001 | Ferris | H02G 15/18 | 174/84 R |
| 7,219,399 B2 * | 5/2007 | Tamm | H01R 4/52 | 24/115 M |
| 7,488,195 B2 * | 2/2009 | Sokol | H01R 4/70 | 174/138 F |
| 7,799,996 B2 * | 9/2010 | Tamm | H01R 4/52 | 174/88 R |
| 2006/0108140 A1 * | 5/2006 | Wiley | H01R 4/04 | 174/84 R |
| 2007/0074378 A1 * | 4/2007 | Tamm | H01R 4/52 | 24/136 L |
| 2009/0298358 A1 * | 12/2009 | Tamm | H01R 4/52 | 439/863 |

* cited by examiner (PRIOR ART)
FIG. 1

AUTOMATIC SPLICE WATER DRIP NOSE CONE

REFERENCES TO RELATED APPLICATIONS

The present invention is a continuation of U.S. application Ser. No. 13/630,625 to Cawood, filed on Sep. 28, 2012 and now issued as U.S. Pat. No. 9,537,297, which claims priority to U.S. Provisional Application No. 61/541,846 to Cawood, filed on Sep. 30, 2011, both of which are incorporated herein by reference in their entirety.

FIELD OF THE INVENTION

The present invention is generally directed toward automatic tension splice connectors. More particularly, it is directed toward a nose cone for such an automatic tension splice connector that removes liquids from cables before it can damage the automatic splice.

BACKGROUND OF THE INVENTION

Automatic splices are commonly used to connect suspended cables, such as overhead power lines, together. The lineman can simply push the cable into each end of the automatic splice, and serrated jaws on the interior of the automatic splice will hold the cable in place. Greater tension on the cable will result in increased holding force of the cable within the automatic splice.

A common issue with automatic splices is failure due to corrosion caused by water travelling down the cable strands and entering the connector body.

SUMMARY OF THE INVENTION

An object of this invention is to provide a device for removing water from a cable so as to prevent corrosion of the automatic splice. The disclosed device consists of fingers that come into contact with the cable and are capable of wicking water away from the cable so that it may drip away from the automatic splice.

In accordance with one aspect of the present invention, there is provided a device for removal of liquids from a cable entering an automatic splice comprising a first portion of said outer casing and a second portion of said outer casing, said outer casing configured to surround a length of said cable when said first portion of said outer casing and said second portion of said outer casing are joined together and to interface with said automatic splice, and a plurality of arrays of fingers protruding inwardly from an interior surfaces of each of said first portion of said outer casing and said second portion of said outer casing, wherein said fingers are capable of wicking liquids away from said cable.

In accordance with another aspect of the present invention, there is provided a device for splicing a first cable and a second cable comprising an automatic splice, at least one outer casing comprising a first portion of said outer casing and a second portion of said outer casing, said outer casing configured to surround a length of said first cable when said first portion of said outer casing and said second portion of said outer casing are joined together and to interface with said automatic splice, and a plurality of arrays of fingers protruding inwardly from an interior surface of said first portion of said outer casing and said second portion of said outer casing into said interior space, wherein said fingers are capable of wicking liquids away from said first cable.

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1:
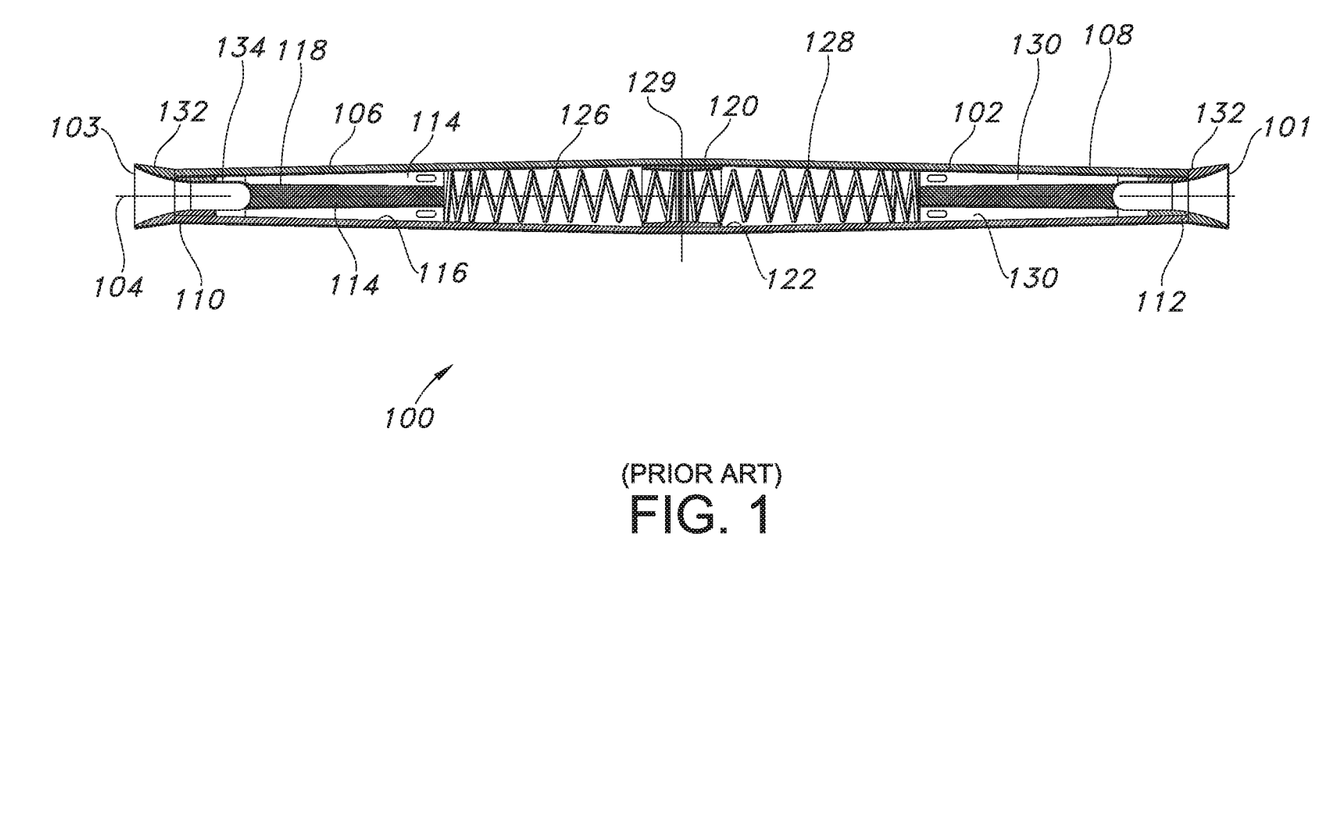
FIG. 1 depicts a view of a prior art automatic splice.

Referring to the drawings, FIG. 1. illustrates an automatic splice 100 as found in the prior art. The automatic splice 100 typically has a tubular body 102 with openings 101 and 103 at either end for receiving a cable. The tubular body 102 is widest in the middle and tapers to its narrowest points at tubular body ends 110 and 112. Funnel guides 132 are disposed at both tubular body ends, 110 and 112.

Funnel guides 132 initially receive the cable end and guide all strands of the cable toward the interior cavity of the automatic splice 100. As the cable is pushed toward the center of the automatic splice, pilot cup 134 surrounds the end of the cable and guides the cable between serrated jaws 114 or 130.

Serrated jaws 114 and 130 can move freely within tubular body 102, but are pushed toward ends 101 or 103 by means of compression springs 126 or 128. The cable can be pushed toward center 124, but when the cable is pulled toward openings 101 or 103, serrated jaws 114 or 130 engage the cable firmly. The tapering of tubular body 102 causes serrated jaws 114 or 130 to tighten more firmly around the cable as more tension is applied to the cable away from the center of the tubular body 102.

In automatic splices of the prior art, water may enter the automatic splice 100 by running along the cable. The water would then typically begin to corrode the metal parts of the interior mechanisms of automatic splice 100, such as compression springs 126 and 128, or serrated jaws 114 and 130.

However, the disclosed invention can be used to remove water from the cable before it enters the interior of tubular body 100.

Figure 2:
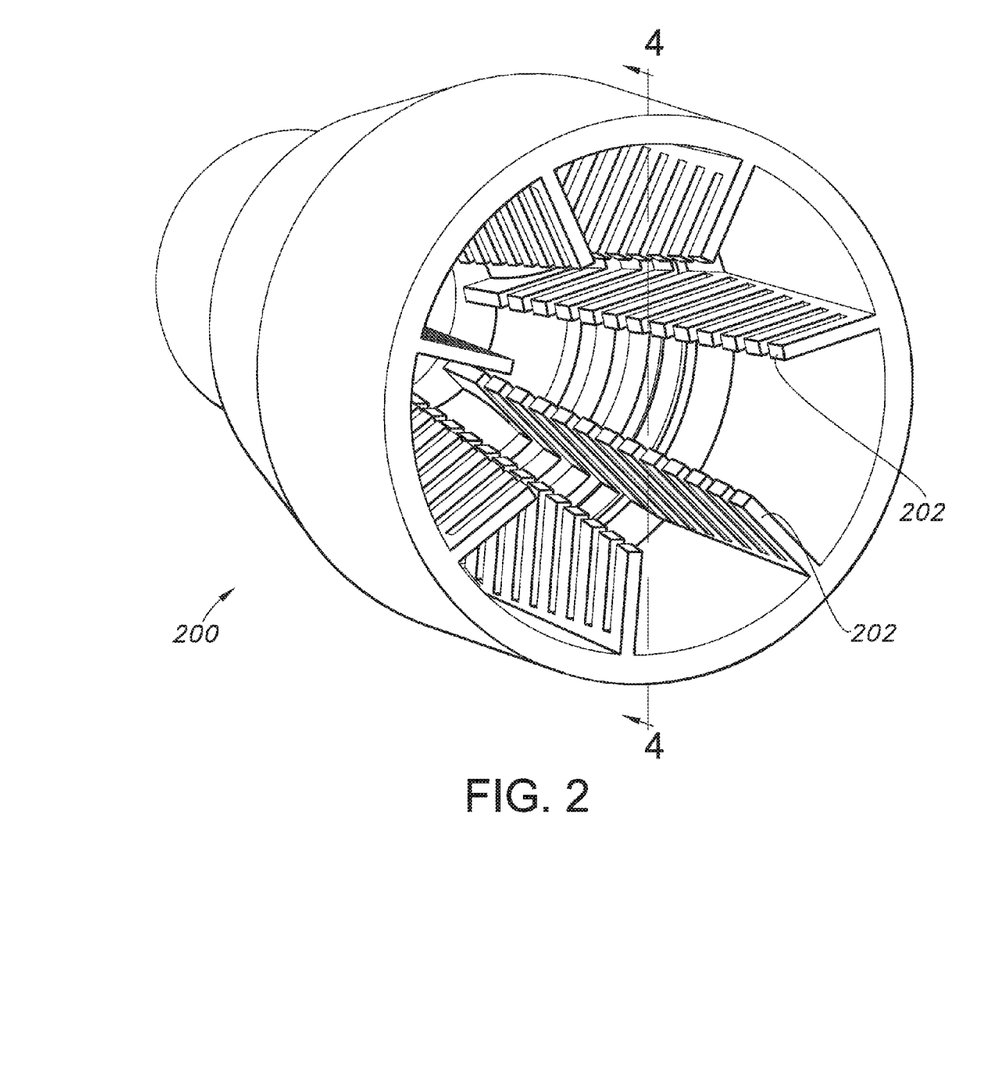
FIG. 2 depicts a perspective view of the claimed device.
Figure 3:
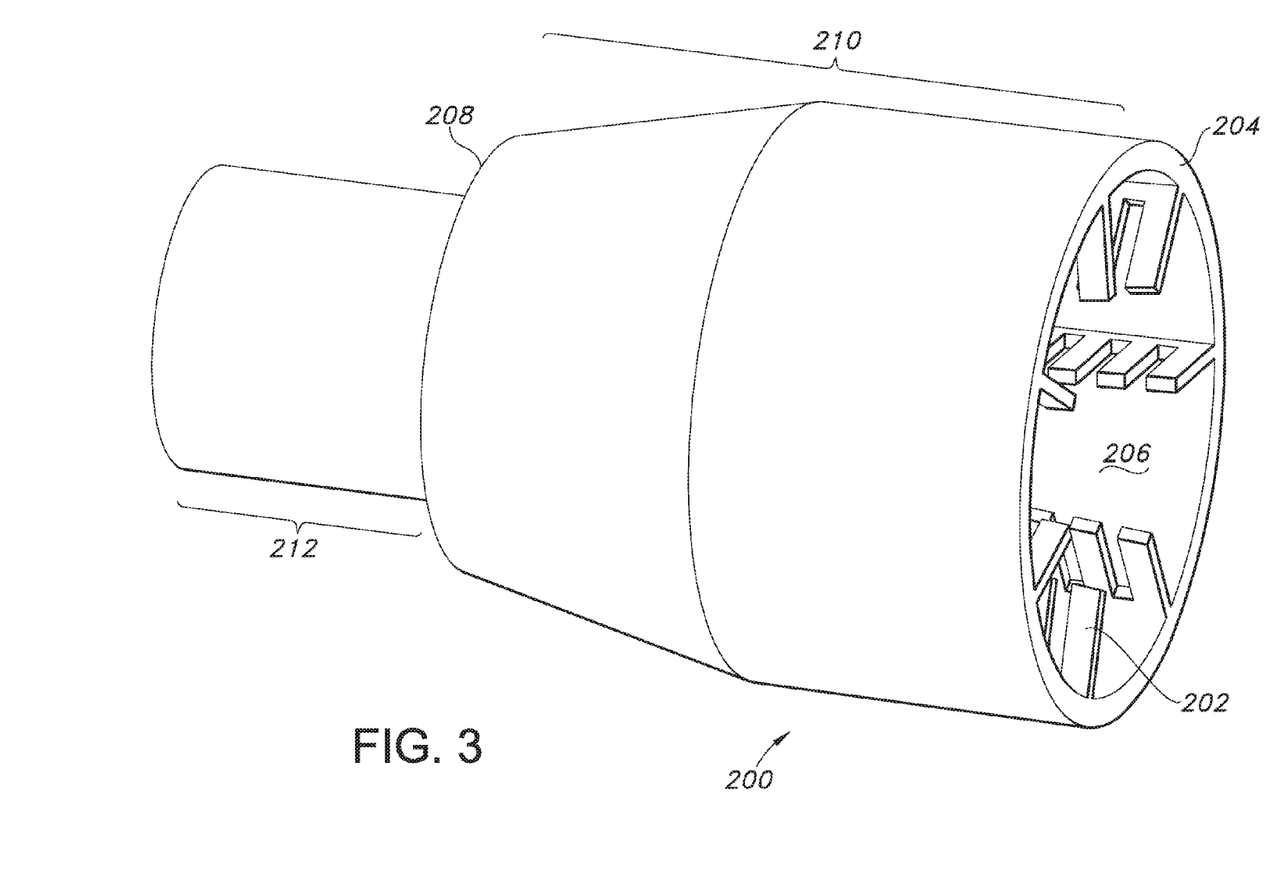
FIG. 3 depicts another perspective view of the claimed device.
Figure 4:
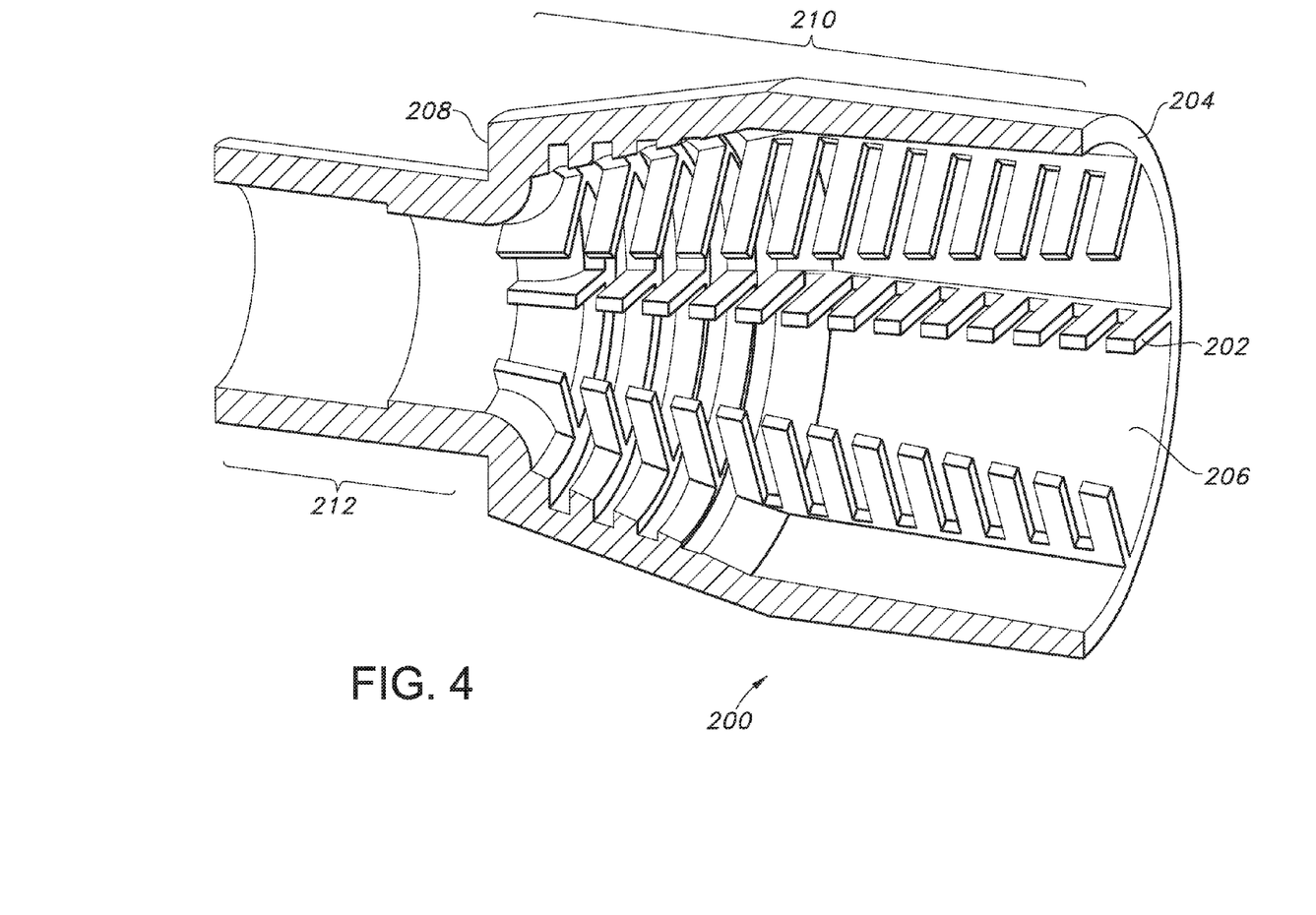
FIG. 4 depicts a cross-sectional view of the claimed device as taken along line 4-4 of FIG. 2.

As will be appreciated from FIGS. 2, 3, and 4, water drip nose cone 200, consists of an outer casing 204 surrounding an interior space 206. Fingers 202 extend from outer casing 204 into interior space 206. The interior space 206 extends through the length of the outer casing 204 and is sufficiently large for a cable to pass through. The fingers 202 are configured to come into contact with strands of the cable when it is inserted through the water drip nose cone 200. Fingers 202 will then wick away any water from the cable, resulting in the water dripping out of the outer casing 204 away from the automatic splice 100.

Outer casing 204 is configured to generally interface with the opening of automatic splice 100. It consists of nose cone 210 and an end piece 212. End piece 212 may be narrower than funnel guide 132 and may enter the opening 101 or 103 of the automatic splice when the cable is being inserted into the automatic splice 100. Stop wall 208 prevents the nose cone 210 from being inserted into the automatic splice 100. Alternatively, end piece 212 may be slightly larger than funnel guide 132, such that the automatic splice 100 slides into end piece 212. Nose cone 210 can be any shape, although preferably it is designed such that gravity will cause water to collect at the lowest point of the nose cone 210 and drip out of the lower edge.

Figure 5:
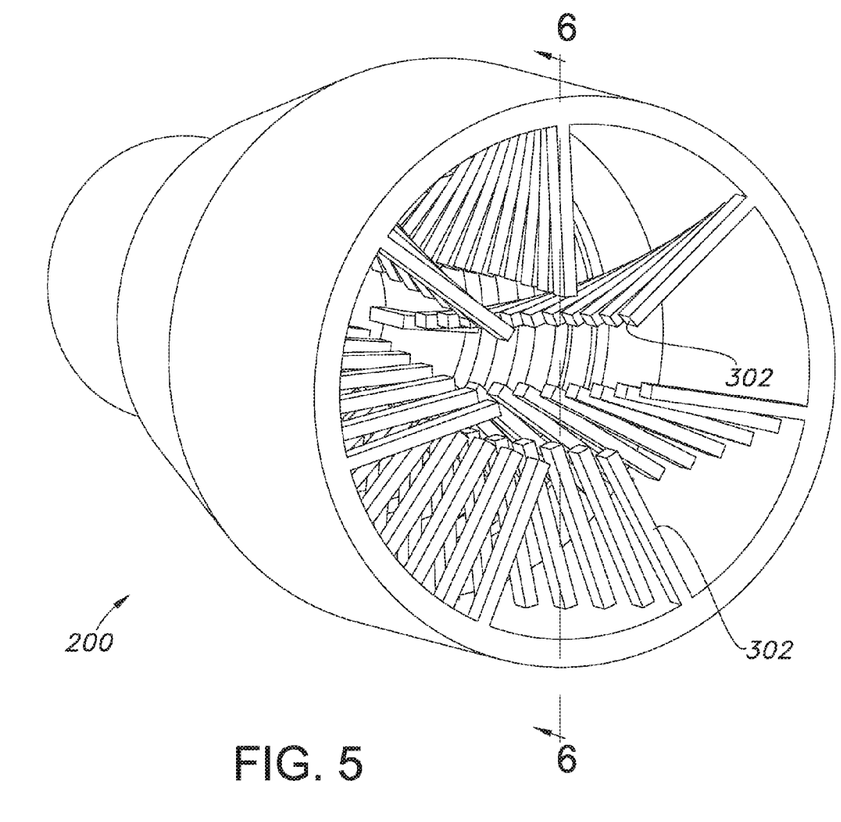
FIG. 5 depicts a perspective view of the claimed device showing fingers in spiraled rows.
Figure 6:
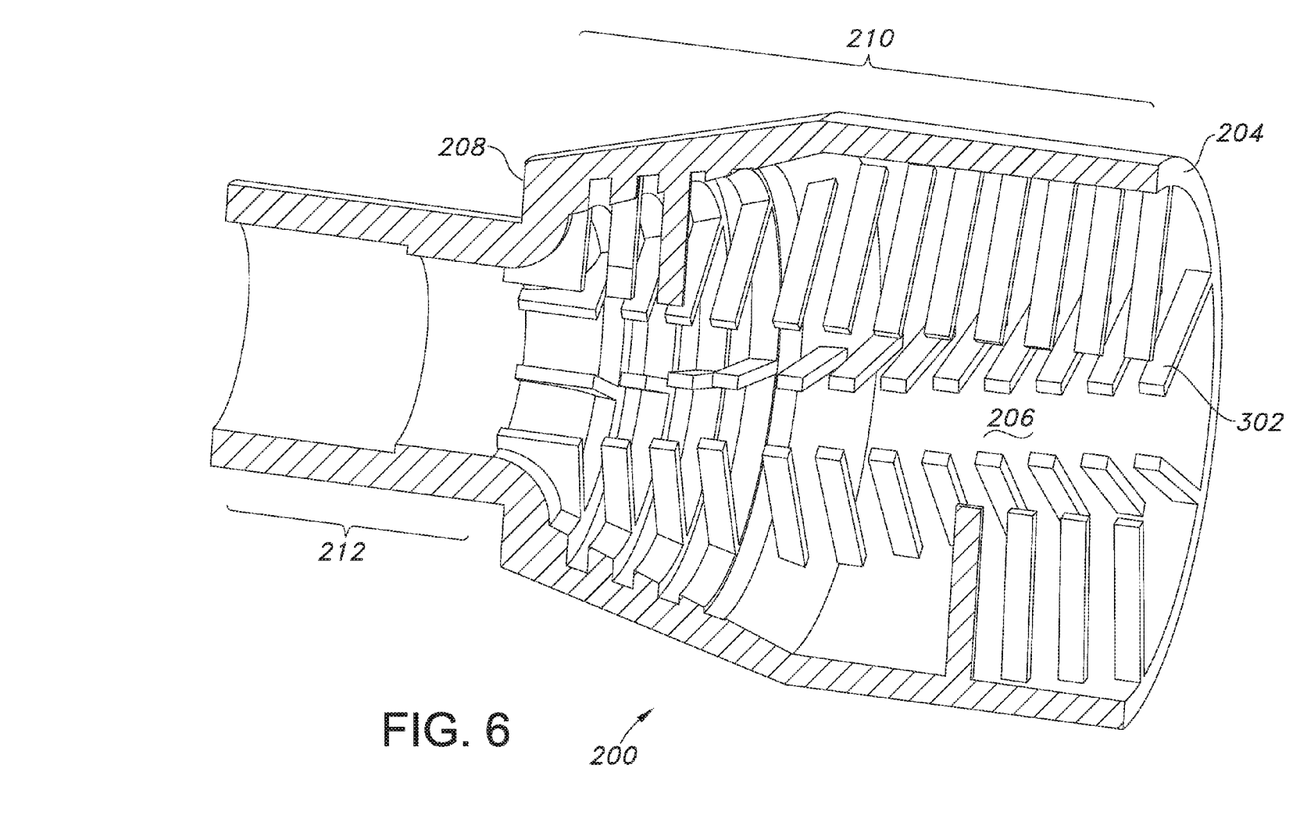
FIG. 6 depicts a cross-sectional view of the claimed device showing fingers in spiraled rows as taken along line 6-6 of FIG. 5.
Figure 7:
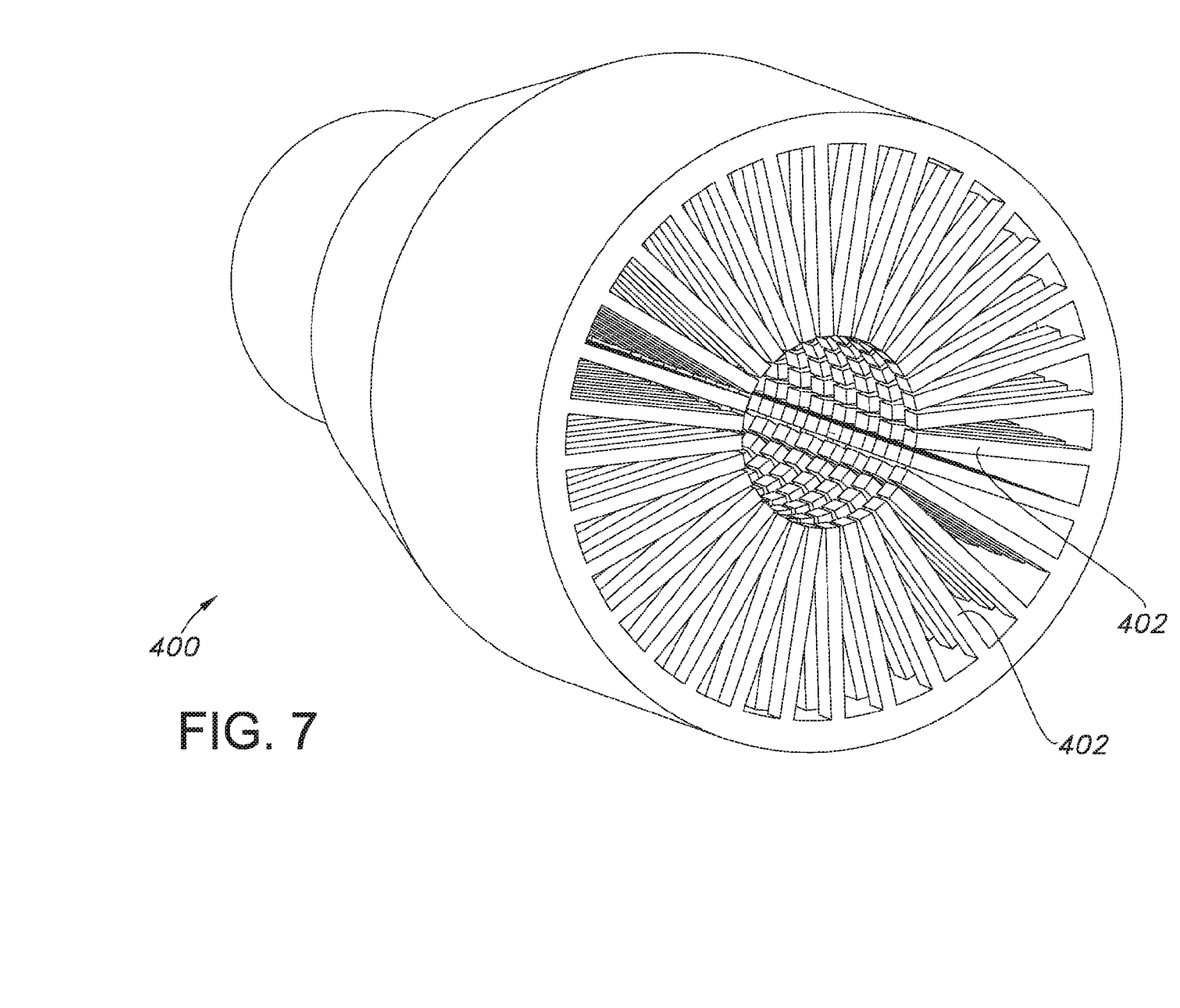
FIG. 7 depicts a perspective view of the claimed device showing fingers covering the interior of the outer casing.

Fingers 202 may be constructed of a typical brush material, such as plastic, rubber, fiber, or metal. Fingers 202 serve two purposes: first, they may brush off any debris from the cable, and, second, they wick water liquids from the strands of the cable. It should be appreciated that in instances where fingers 202 are made of metal, the fingers 202 additionally serve to act as an inverted wire bristle brush that can remove corrosion. In such a configuration, as the cable is pushed through the water drip nose cone 200, the metal fingers 202 will also scrape off any corrosion that may have already formed on the cable strand. Although shown to be arranged in rows in the figures (see FIGS. 2-4), fingers 202 may be arranged in any pattern or arrays, including spirals (see, e.g., fingers 302 in FIGS. 5-6) or fully cover the interior of the outer casing 204 (see, e.g., fingers 402 in FIG. 7).

In a preferred embodiment, the water drip nose cone 200 is made of injected, molded plastic. The fingers 202 may be integrally molded into water drip nose cone 200, or the fingers may be constructed of at least one separate piece 213 that is then inserted into the water drip nose cone 200.

In one embodiment, the water drip nose cone 200 may be a separate component from the automatic splice 100. In such case, the cable would first be inserted fully through the water drip nose cone 200, such that the leading tip of the cable is within or protrudes just beyond end piece 212. The cable and water drip nose cone 200 will, then, be pushed against the automatic splice opening until the water drip nose cone 200 comes to a stop. The cable will be pushed along farther, causing it to slide through the water drip nose cone 200 and into the automatic splice 100.

In another embodiment, the fingers 202 may be incorporated directly into the automatic splice such that fingers 202 protrude from the funnel guides 132.

Figure 8:
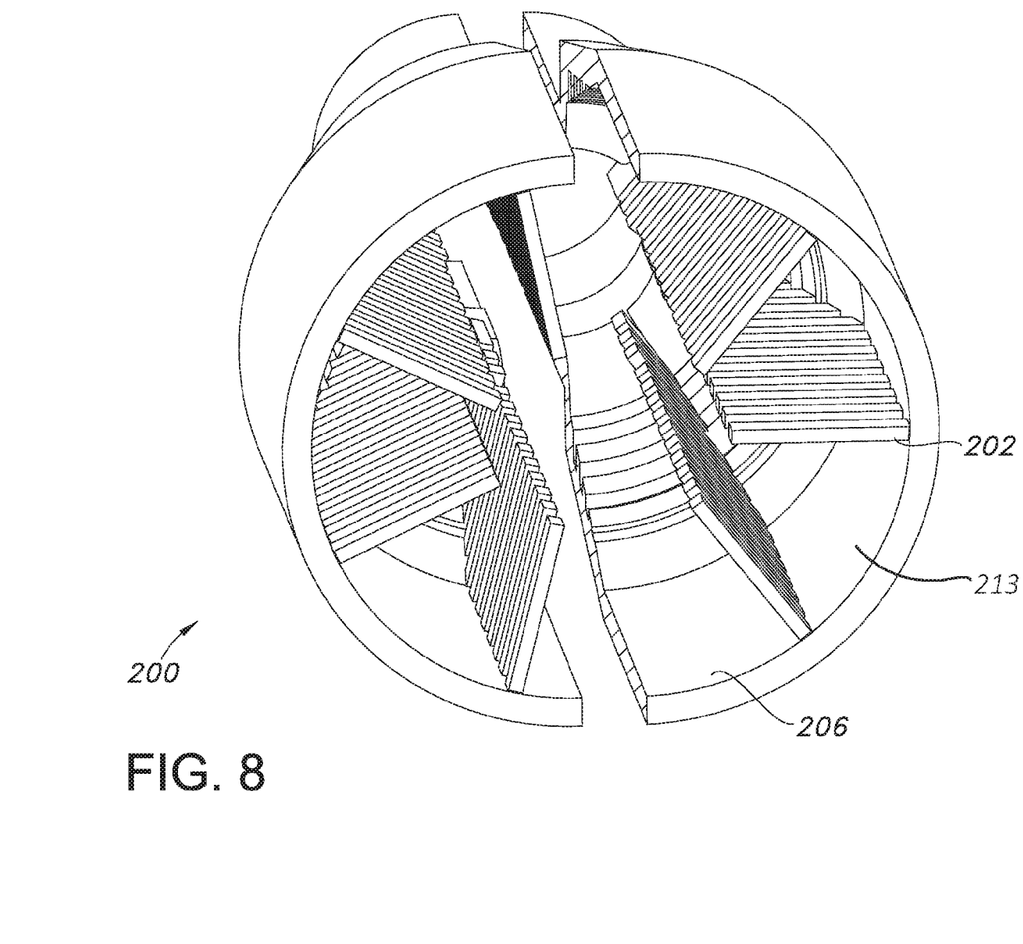
FIG. 8 depicts a perspective view of the claimed device showing a two-piece (two halves) design of the outer casing.

In another embodiment, the water drip nose cone 200 may also be designed for a retrofit application where the cable has already been inserted into automatic splice 100. In such case, the water drip nose cone would be constructed as a clamshell design with outer casing 204 constructed in two halves, as shown in FIG. 8. The two halves would be closed around the cable to form a complete water drip nose cone 200. The water drip nose cone 200 would then be pushed against funnel guide 132.

The water drip nose cone 200, is simple to use. The cable is first inserted fully through the water drip nose cone 200 before it is pushed into the automatic splice 100. Any water or debris will be brushed off by the water drip nose cone 200. Once in place, as any other liquid, flows down the cable toward the automatic splice 100, the fingers 202 will wick away the liquid from the cable and draw it toward the outer casing 204. The water will collect at the bottom of the outer casing 204 and then will drip out of the lower edge of it.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

I claim:

1. A device for removal of liquids from a cable entering an automatic splice comprising
   a. an outer casing comprising a first portion of said outer casing and a second portion of said outer casing, said outer casing configured to surround a length of said cable when said first portion of said outer casing and said second portion of said outer casing are joined together and to interface with said automatic splice; and b. a plurality of arrays of fingers protruding inwardly from an interior surfaces of each of said first portion of said outer casing and said second portion of said outer casing, wherein said fingers are capable of wicking liquids away from said cable.

2. The device of claim 1, wherein said outer casing is further configured to cause said liquids to drip away from said automatic splice.

3. The device of claim 1, wherein said fingers are made of plastic.

4. The device of claim 1, wherein said fingers are made of metal.

5. The device of claim 1, wherein said fingers are made of rubber.

6. The device of claim 1, wherein said fingers are made of fiber.

7. The device of claim 1, wherein said fingers are arranged in a pattern selected from the group consisting of longitudinal comb rows along said interior surface, longitudinal spiraled rows along said interior surface, and a brush covering said interior surface.

8. The device of claim 1, wherein said fingers are constructed of at least one separate piece to be inserted into said device.

9. The device of claim 1, wherein each of said first portion and said second portion of said outer casing comprises a nose cone and an end piece.

10. The device of claim 9, wherein said end pieces of said first portion and said second portion of said outer casing are narrower than a funnel guide of said automatic splice.

11. The device of claim 10, wherein each of said end pieces of said first portion and said second portion of said outer casing further comprises a stop wall.

12. The device of claim 9, wherein said end pieces of said first portion and said second portion of said outer casing are larger than a funnel guide of said automatic splice.

13. A device for splicing a first cable and a second cable comprising:
  a. an automatic splice;
  b. at least one outer casing comprising a first portion of said outer casing and a second portion of said outer casing, said outer casing configured to surround a length of said first cable when said first portion of said outer casing and said second portion of said outer casing are joined together and to interface with said automatic splice; and
  c. a plurality of arrays of fingers protruding inwardly from an interior surface of said first portion of said outer casing and said second portion of said outer casing into said interior space, wherein said fingers are capable of wicking liquids away from said first cable.

14. The device of claim 13, wherein said outer casing is further configured to cause said liquids to drip away from said automatic splice.

15. The device of claim 13, wherein said fingers are made of plastic.

16. The device of claim 13, wherein said fingers are made of metal.

17. The device of claim 13, wherein said fingers are made of rubber.

18. The device of claim 13, wherein said fingers are made of fiber.

19. The device of claim 13, wherein said fingers are arranged in a pattern selected from the group consisting of longitudinal comb rows along said interior surface, longitudinal spiraled rows along said interior surface, and a brush covering said interior surface.

20. The device of claim 13, wherein said fingers are constructed of at least one separate piece to be inserted into said device.

21. The device of claim 13, wherein each of said first portion and said second portion of said outer casing comprises a nose cone and an end piece.

22. The device of claim 21, wherein said end pieces of said first portion and said second portion of said outer casing are narrower than a funnel guide of said automatic splice.

23. The device of claim 22, wherein each of said end pieces of said first portion and said second portion of said outer casing further comprises a stop wall.

24. The device of claim 21, wherein said end pieces of said first portion and said second portion of said outer casing are larger than a funnel guide of said automatic splice.

25. The device of claim 13, wherein said at least one outer casing is two outer casings.

\* \* \* \* \*